March 20, 1945. C. L. LOHNER ET AL 2,371,967
TREATMENT OF ANIMAL CARCASSES
Filed Jan. 22, 1942
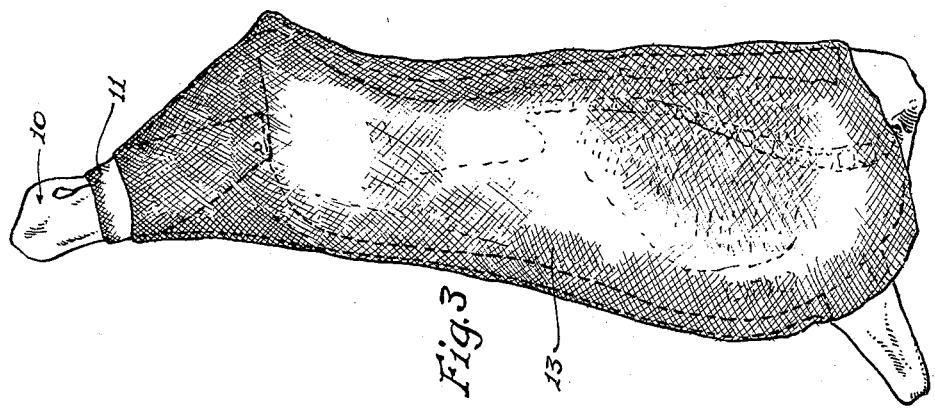
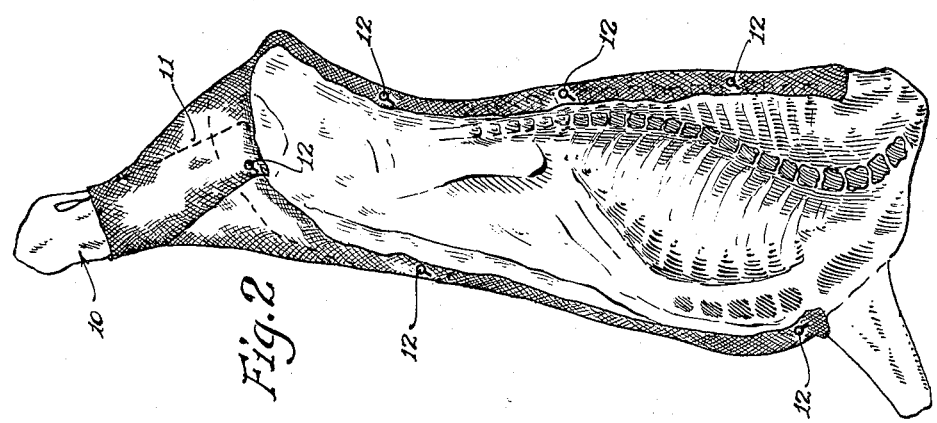
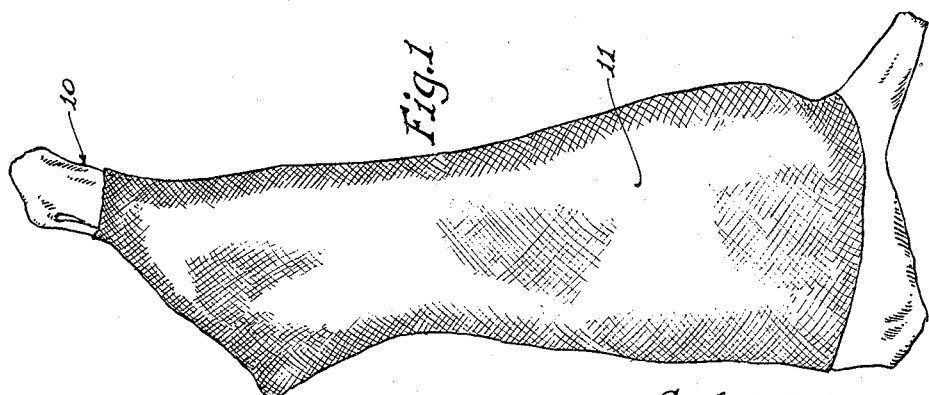
Carl L. Lohner
and Dean E. Rueckert
INVENTORS
ATTEST-
Wm. C. Meiser
BY R. G. Story
ATTORNEY Patented Mar. 20, 1945

2,371,967

UNITED STATES PATENT OFFICE 2,371,967

TREATMENT OF ANIMAL CARCASSES

Carl L. Lohner, Chicago, and Dean E. Rueckert, Mokena, Ill., assignors to Industrial Patents Corporation, Chicago, Ill., a corporation of Delaware Application January 22, 1942, Serial No. 427,752

7 Claims. (Cl. 99—174)

This invention relates to a method of treating carcasses and more particularly it is directed to the wrapping of animal carcasses such as beef sides so as to reduce loss by shrinkage and dehydration and to improve their appearance without deterioration of the meat.

It has been the general practice to place dressed carcasses in a cooling chamber where they are kept until the animal heat has been removed, after which the carcass is transferred to a holding cooler until shipped. With such handling the fatty surface on the skinned carcass, if left uncovered, hardens into a rough, irregular, off-colored and unattractive appearing surface when the carcass cools. Furthermore, excessive evaporation or shrinkage of meat juices takes place, particularly in those areas where fat covering is thin or non-existent. Such excessive moisture loss actually impairs the ultimate eating quality of the meat to the consumer.

It has been proposed heretofore to apply a brine soaked cloth to the outer fatty surface after the carcass has been dressed and washed on the killing floor, and maintaining this cloth on the carcass during the chilling period, i. e., period of 16–24 hours during which the so-called animal heat is removed. The cloth is then removed. We have found that much of the reduction in excessive shrink during chill period is lost when the cloth is removed after the chilling period (16 to 24 hours).

According to the present invention we keep this cloth on not only during the chilling period but also during the subsequent period in the holding cooler prior to shipping. Our investigations have shown that appreciably better retention of moisture content is obtained in this manner and that practically all of the advantage is retained even after the carcass has reached the final distributing units after 4 days in transit and after several days holding at the distributing unit. The clothing of the outside or fatty surface of the carcass protects about 70% of the actual surface but the remaining 30% consisting of concave area on inside of carcass plus lean meat areas in the vicinity of neck, brisket, etc. has appreciably greater moisture content per unit of area than the outer fatty surface and therefore is more subject to shrinkage than the fatty surface.

The present invention further contemplates an important extension of and improvement over the prior art by shrouding not only the fatty surface but also covering the inner side of carcass by applying a wet muslin cloth to span across the concave opening or cavity and to be brought tightly in direct contact with the lean surface on the inner side of the carcass. This action approximately doubles the total reduction obtained in excessive evaporation loss and in preventing dehydration of lean tissue on inner side, maintains the lean tissue in fresh, attractive condition which represents a distinct advantage from sales standpoint and preserves for the ultimate consumer the original fresh and juicy condition of lean meat which are imperative for good flavor of meat.

Reference is now made to the accompanying drawing which shows one embodiment of the invention as applied to the clothing of sides of beef.

In the drawing,

Figure 1 represents a view of the outside of a side of beef clothed in accordance with the prior art.

Figure 2 is a view taken opposite that of Figure 1 and shows the inside of a beef unclothed in accordance with the prior art.

Figure 3 indicates a side of beef such as shown in Figures 1 and 2 fully clothed in accordance with the present invention both the inside and the outside of the side of beef being covered with a cloth.

Referring to the drawing, numeral 10 represents a side of beef fully dressed in accordance with commercial packing house practice. The numeral 11 indicates a shroud affixed to the outside of the carcass side by skewers 12. The numeral 13 represents a cloth or shroud covering the inside of the carcass side and also affixed to the carcass side by skewers such as shown by 12.

Figures 1 and 2 represent the method of clothing beef prior to the present invention. Figure 1 showing an outside view of a side of beef and Figure 2 showing an inside view. It will be observed in Figures 1 and 2 that, in accordance with prior practice, the shroud is applied only to the skinned outside or fatty surface, the inside of the carcass side as shown in Figure 2 remaining unclothed. As practiced heretofore, a cloth 11, such as a brine soaked cloth, is wrapped around the carcass side so as to cover substantially all of the outside or skinned surface and affixed thereto by the skewers 12. The edges of the cloth 11 where it is fixed to the carcass side by the skewers 12 extend only to the edge of the inside, i. e., bony or lean surface of the carcass side.

In accordance with the present invention, an additional cloth 13, shown in Figure 3, is applied over the inside of the carcass side covering that portion heretofore left unclothed. As shown in Figure 3, the clothing of the inside of the carcass is done by means of a second cloth which is secured about the hind leg by overlapping the two edges of wet cloth (without pins) and is draped down, covering the inside or cavity of carcass side. It will be understood, of course, that it is not necessary to use two cloths and that one cloth may be used by wrapping a single cloth entirely around the carcass, covering both the outside and inside surfaces. The method of affixing the cloth or cloths to the carcass may be varied, accordingly, it is unnecessary to use skewers as the cloth may be draped around the carcass including the inside surface. It is important to enclose the visceral cavity and to cover the exposed bones and split surfaces thereof as closely as possible. In practice the cloth is draped across the inside surface and may be held in place by any convenient means.

The method of the present invention involves generally the full shrouding of a warm carcass for at least one day but less than ten days with a relatively pervious wrapping, preferably one which has been soaked in 20° salometer brine. Although not essential to successful operation, the full shrouding is advantageously pulled tightly over the skinned surface of the carcass before the animal heat has left the carcass in order to mold and form the surface and to effect maximum bleaching of said surface. The tight shrouding may be loosened after sixteen to twenty-four hours, or if desired the shrouding may be temporarily removed, to grade the meat. The full shrouding preferably remains on the carcass for a total period of at least two days and not more than seven days for optimum results on shrinkage and dehydration resistance without depreciation of the meat condition such as surface sliming. It has been found that the full shrouding of the carcass to cover the interior of the carcass produces a surprising increase in resistance to dehydration and a permanent reduction in shrink, since the additional area protected is the leaner portion of the carcass which is not covered with a fat layer such as the skinned surface, which has been the only portion covered previously. The lean meat now retains its color and appearance much better than was formerly attainable.

To illustrate the present invention but not to limit the scope thereof the following example is given.

*Example*

A half beef carcass is shrouded in muslin which has been soaked in a warm, sodium chloride water solution 20° salometer reading strength, by stretching the muslin as tightly as possible over the outside, fat or skinned surface of the carcass side, and also the inside or bone side of the carcass side. The cloth is held in the secure position through the use of steel pins. When the carcass has been completely covered, any excess cloth is draped loosely along the inside or bone side and is fastened with a steel pin where it overlaps on the rump. It has been found satisfactory to use one pin in the round, one at the base of the tail, two in the brisket, one in the flank, three in the loin, two in the rib, and one on the chuck. When this operation has been completed the carcass side is transferred to the cooler and within twenty-four hours after slaughter, preferably sixteen hours, the adhering muslin is loosened but not removed from the carcass side by removing all the steel pins on the skinned surface. One pin is replaced in the cod or udder fat to facilitate holding the cloth loosely about the carcass for a maximum of ten but preferably not more than seven days after slaughter.

Upon removal of the shroud just prior to shipping or at some period before the expiration of seven days after slaughter, the carcass side is found to have a very desirable bloom and a substantially lighter color both in the fat and meat portions. Furthermore, there is substantially no loss due to dehydration and shrinkage in any portion of the carcass side and the quality of the meat is substantially the same as when first placed in the chiller. Most important, however, is the fact that the full draping of the carcass results in a permanent improvement in resistance to dehydration and shrinkage. This is illustrated in the following table setting forth the results obtained by treating seven groups of eighty-four cattle, each group in two portions; one according to the example given above (16 hours tight shrouding, then full loose draping for various periods), and the other group by the earlier procedure of clothing the carcasses on the fat side only and removing the cloth completely after approximately sixteen hours from the time of killing. The percent shrink of the novel test samples at various times after removal of the shrouding at the end of full loose shrouding of different phases is given in comparison with control samples which have remained partially shrouded for sixteen hours and completely unshrouded for the remainder of the corresponding period.

| Days after full shroud removal | | Number of days shroud was held on test cattle | | | | | | |
|---|---|---|---|---|---|---|---|---|
| | | 1 | 2 | 3 | 4 | 5 | 6 | 7 |
| 0 | Control | 1.113 | 1.200 | 1.422 | 1.598 | 1.653 | 1.805 | 1.940 |
| | Test | .929 | 1.000 | 1.206 | 1.252 | 1.400 | 1.426 | 1.592 |
| | Savings | .184 | .200 | .216 | .346 | .253 | .379 | .348 |
| 1 | Control | 1.415 | 1.486 | 1.605 | 1.813 | 1.764 | 1.950 | |
| | Test | 1.273 | 1.230 | 1.395 | 1.451 | 1.480 | 1.527 | |
| | Savings | .142 | .256 | .210 | .362 | .284 | .423 | |
| 2 | Control | 1.570 | 1.609 | 1.733 | 1.927 | 1.885 | | |
| | Test | 1.430 | 1.375 | 1.545 | 1.542 | 1.590 | | |
| | Savings | .140 | .234 | .188 | .385 | .295 | | |
| 3 | Control | 1.685 | 1.726 | 1.865 | 2.091 | | | |
| | Test | 1.588 | 1.510 | 1.669 | 1.703 | | | |
| | Savings | .097 | .216 | .196 | .388 | | | |
| 4 | Control | 1.804 | 1.857 | 2.049 | | | | |
| | Test | 1.640 | 1.630 | 1.806 | | | | |
| | Savings | .164 | .227 | .243 | | | | |
| 5 | Control | 1.924 | 1.964 | | | | | |
| | Test | 1.818 | 1.754 | | | | | |
| | Savings | .106 | .210 | | | | | |
| 6 | Control | 2.092 | | | | | | |
| | Test | 1.987 | | | | | | |
| | Savings | .105 | | | | | | |

From these data it can be readily seen that the two stages of tight covering for sixteen hours followed by lose draping for periods of over one day produced products which resisted dehydration even when totally uncovered to a substantially greater extent than those which were covered with only partial shrouding. It is preferred to employ a fabric such as desized muslin which is soaked in water or other aqueous liquid such as sodium chloride or other nontoxic salt brine. It is possible, however, to employ a dry pervious material which may or may not have been previously impregnated with salts, preservatives, flavoring materials and/or the like.

Through the complete shrouding of the carcass, more effective bleaching of the fat and meat is apparently brought about because air does not circulate between the carcass and the muslin as readily and therefore the bleaching is carried out over a longer period, since the cloth dries out more slowly. In addition, there is less weight shrinkage through the loss of water than in ordinary practice, since complete shrouding during the critical period between the time the carcass, containing the body heat, is placed in the cooler, and the time the meat reaches the temperature of the cooler, prevents the customary excessive loss of moisture.

From the best results in bleaching and smoothing of the fat and retention of bloom it is necessary that the previous material be stretched tightly across the outer fat surface. However, it is within the scope of this invention to fully shroud the beef or other carcass without putting tension across the fat surface, thus obtaining the improved results on low dehydration losses, shrink resistance and permanent resistance to dehydration and shrinkage when the shroud is removed.

The muslin or other pervious covers may be used innumerable times if after each operation they are laundered and then immersed in brine and applied to the carcass while wet.

The process of shrouding may be used on carcasses other than beef, such as lamb or veal, and although it is preferable to have the carcass severed into two sides, the shroud may be applied with equal success to the whole carcass.

After removal of the shrouding the carcass may be marketed directly or it may be covered with a suitable wrapping, for example brine desized muslin, with or without an outer impervious wrapping such as a paper bag, or with a grease resistant paper, followed by a stockinette.

Obviously many modifications and variations of the invention hereinbefore set forth may be made without departing from the spirit and scope thereof, and therefore only such limitations should be imposed as are indicated in the appended claims.

We claim:

1. A process for treating animal carcasses to reduce shrinkage during cooler storage which comprises substantially completely wrapping a freshly dressed beef carcass including the outer fatty portion and the inner cavity while the carcass is warm with a desized muslin, holding a portion of the muslin in tight contact with the fat surface until the carcass has cooled, loosening the muslin from the fat surface, and holding the carcass with the full covering for a total period of coverage of at least two but not more than seven days.

2. A process for treating animal carcasses to reduce shrinkage during refrigeration which comprises draping a cloth around the warm freshly skinned carcass including the outer fatty surface and the inner bony portion and holding the carcass with the full loose shroud thereon for about one to ten days under refrigeration.

3. A process for treating animal carcasses to reduce shrinkage during aging under refrigeration which comprises tightly covering the carcass, including the outer skinned surface and the bony cavity with a cloth, maintaining the tight covering until the animal heat is dissipated and the surface smoothed, then loosening the cloth to form a loose shroud over the bony cavity and holding the resulting product for about one to seven days under refrigeration.

4. A process for treating fresh beef sides to reduce shrinkage during cooler storage which comprises tightly covering the freshly skinned sides including the fatty outer surface and the bony cavity with a cloth so that the surface is smoothed, chilling the tightly clothed carcass, then after the carcass has cooled loosening the cloth to form a drape and maintaining the carcass so draped during the cooler holding period.

5. A process for treating animal carcasses to reduce shrinkage which comprises protecting prior to dissipation of the animal heat the freshly skinned carcass, including the surface from which the hide has been removed and the inner cavity, with a cloth and maintaining said cloth on the carcass until it has cooled.

6. A process for treating freshly skinned animal carcasses to reduce shrinkage which comprises applying a cloth covering over the warm carcass, including the surface from which the skin has been removed and the visceral cavity, and holding the clothed carcass in a cooler until the animal heat has been dissipated.

7. A process for treating animal carcasses to retard evaporation losses which comprises shrouding the freshly skinned carcass, including the surface from which the skin has been removed and the visceral cavity, with a brine soaked cloth and then subjecting the shrouded carcass to refrigeration conditions.

CARL L. LOHNER.
DEAN E. RUECKERT.